US011375698B2

(12) United States Patent
Roche

(10) Patent No.: US 11,375,698 B2
(45) Date of Patent: Jul. 5, 2022

(54) SELF-CLEANING PRE-FILTER FOR A WATER CIRCULATION PUMP

(71) Applicant: Stephen D. Roche, Nashville, TN (US)

(72) Inventor: Stephen D. Roche, Nashville, TN (US)

(*) Notice: Subject to any disclaimer, the term of this patent is extended or adjusted under 35 U.S.C. 154(b) by 598 days.

(21) Appl. No.: 16/366,680

(22) Filed: Mar. 27, 2019

(65) Prior Publication Data
US 2019/0216061 A1 Jul. 18, 2019

Related U.S. Application Data

(63) Continuation-in-part of application No. 16/057,577, filed on Aug. 7, 2018, now abandoned, which is a continuation of application No. 14/317,496, filed on Jun. 27, 2014, now Pat. No. 10,070,629, which is a
(Continued)

(51) Int. Cl.
| | |
|---|---|
| *A01K 63/04* | (2006.01) |
| *C02F 3/32* | (2006.01) |
| *B01D 35/02* | (2006.01) |
| *C02F 1/00* | (2006.01) |
| *C02F 103/00* | (2006.01) |

(52) U.S. Cl.
CPC .......... *A01K 63/045* (2013.01); *A01K 63/04* (2013.01); *B01D 35/02* (2013.01); *C02F 1/001* (2013.01); *C02F 3/32* (2013.01); *C02F 2103/007* (2013.01); *C02F 2303/24* (2013.01)

(58) Field of Classification Search
USPC ............ 119/259, 230, 260, 227; 210/167.21, 210/167.22, 170.02, 602, 798, 411
See application file for complete search history.

(56) References Cited

U.S. PATENT DOCUMENTS

| | | | | |
|---|---|---|---|---|
| 4,261,822 A | * | 4/1981 | Richardson .......... | B01D 33/073 210/107 |
| 4,822,486 A | * | 4/1989 | Wilkins ............... | B01D 33/067 210/170.09 |

(Continued)

FOREIGN PATENT DOCUMENTS

| | | | | |
|---|---|---|---|---|
| CA | 2624576 | * | 9/2008 | .......... E04H 4/1263 |

OTHER PUBLICATIONS

India Search Report for India Appl. No. 6059/CHENP/2015 dated Jan. 30, 2019, 7 pages.

*Primary Examiner* — Andrea M Valenti
(74) *Attorney, Agent, or Firm* — Hollowell Patent Group; Kelly Hollowell

(57) ABSTRACT

A water circulation pump pre-filter unit (PFU). The PFU is submerged and provides structure to camouflage the system to give a natural and aesthetic look. The PFU comprises at least two cleaning systems: (1) biological cleaning mechanism; and (2) an internal self-cleaning mechanism. Specifically, the PFU comprises several filtering surfaces that form a repository for pond debris on which fish and other aquatic creatures feed, i.e., the biological cleaning mechanism. These filtering surfaces of the PFU also provide a protective barrier that prevents large debris from entering the circulation pump. The internal self-cleaning mechanism is a spray wash water source mechanism used to clean the PFU without removing the PFU or fish from the pond or entering the water. Together these features improve the quality of the water in the pond and extend the life of a pump.

8 Claims, 15 Drawing Sheets

Related U.S. Application Data continuation of application No. 13/836,649, filed on Mar. 15, 2013, now Pat. No. 8,800,496.

(56) References Cited

U.S. PATENT DOCUMENTS

| | | | | |
|---|---|---|---|---|
| 4,831,773 | A | * | 5/1989 | Rostrom ................ A01K 80/00 43/100 |
| 5,254,252 | A | | 10/1993 | Drenner |
| 8,440,073 | B2 | * | 5/2013 | Chen .................... A01K 63/006 210/167.22 |
| 2004/0094470 | A1 | | 5/2004 | Jackson |
| 2008/0061010 | A1 | | 3/2008 | Tom |
| 2010/0233146 | A1 | * | 9/2010 | McDaniel .............. A01N 63/50 424/94.2 |

* cited by examiner

SELF-CLEANING PRE-FILTER FOR A WATER CIRCULATION PUMP

CROSS-REFERENCE TO RELATED APPLICATIONS

This application is a continuation-in-part application of U.S. patent application Ser. No. 16/057,577 filed Aug. 7, 2018, which is a continuation of U.S. patent application Ser. No. 14/317,496 filed Jun. 27, 2014, now U.S. Pat. No. 10,070,629 issued Sep. 11, 2018 which is a continuation of U.S. patent application Ser. No. 13/836,649 filed Mar. 15, 2013, now U.S. Pat. No. 8,800,496 issued Aug. 12, 2014, the entirety of which is herein incorporated by reference.

BACKGROUND OF THE INVENTION

The present invention relates to submerged, low maintenance filters for pond water circulation pumps. More specifically, to a pre-pump filter system having a biological mechanism and an internal self-cleaning mechanism to actively filter water before it enters a circulation pump thus improving water quality and extending the life of the pump.

It is very difficult to keep clean an outdoor Koi pond, ornamental pond or other aquatic habitat stocked with fish (hereafter, a pond). A pond must be kept clean and aerated to maintain a healthy aquatic ecosystem, which typically requires a circulation pump and a water filtration system to move and clean the water. Small particles of debris and algae can pass through standard water circulation pumps, but larger pieces of debris quickly block these pumps, slow water flow and can eventually stop, damage or destroy the pumps. Most filters internal to or associated with pond water circulation pumps are primitive, complicated and require frequent cleaning, part replacement, and monitoring because they cannot effectively manage large quantities or pieces of debris.

One way of protecting the circulation pump is to use a pre-filter placed in line ahead of the pump to prevent large quantities and pieces of debris from entering the intake to the pump (hereafter, a pump intake pipe). However, pre-filters currently on the market are generally not well-suited for ponds because, when located in the pond, they are difficult to access, maintain and are unsightly. When the pre-filter is located outside the pond, the pump intake pipe frequently clogs. Pre-filters currently on the market are typically undersized and their designs actually encourage clogging, resulting in decreased water flow which strains the motor on the pond's circulation pump triggering a fail-safe shutdown of the pump or causing damage to the pump. In the case of a pre-filter rupture, the debris can quickly rush into the intake of the pump and completely compromise its operation.

What is needed is a submerged, low maintenance pre-filter that: (1) will withstand year-round use in an outdoor pond; (2) is of sufficient capacity that it will not easily clog; (3) can be submerged in a pond; (4) captures debris on a filtering surface so that it can be easily accessed by aquatic wildlife or mechanical cleaning methods; (5) can be raised above the bottom of the pond to optimize circulation and allow access to aquatic wildlife; (6) is self-cleaning; (7) may be easily camouflaged without affecting its operation.

SUMMARY OF THE INVENTION

The present invention is a pond water circulation pump pre-filter unit (PFU). The PFU is submerged and provides structural support for camouflage, which gives the system a natural aesthetic look and provides a space for fish to hide from non-aquatic predators. The PFU comprises at least two cleaning systems: (1) biological cleaning mechanism; and (2) an internal self-cleaning mechanism. Specifically, the PFU comprises several filtering surfaces that form a repository that collects pond debris and algae on which fish, snails, frogs, and salamanders (larval stage), crayfish, bacteria, etc. (hereafter, aquatic creatures) feed, i.e., the biological cleaning mechanism. These filtering surfaces of the PFU also serve as the protective barrier that prevents large debris from entering the circulation pump yet allow smaller, harmless particles to pass unimpeded. The internal self-cleaning mechanism is a water spray mechanism used to clean the PFU from the inside-out without removing the PFU from the pond, draining the pond or physically accessing the PFU. Together, these features of the PFU improve the quality of the water in the pond, lower maintenance costs, and extend the life of the pond's water circulation pump.

DETAILED DESCRIPTION OF THE INVENTION

Figure 1:
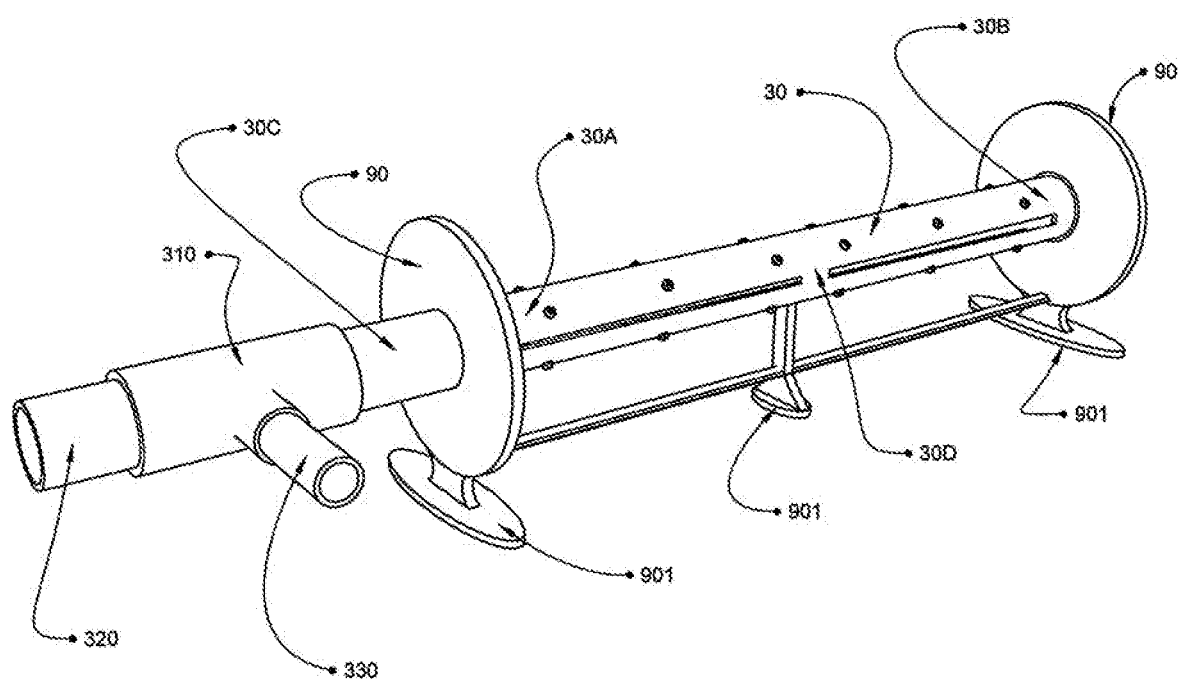
FIG. 1 shows a perspective view of the bidirectional conveyance pipe.

The present invention is a water circulation pump pre-filter unit (PFU) supported by a frame having legs for placement of the PFU inside and at the bottom of a pond. The frame supports the filtering surfaces elevated above the bottom of the pond making them easily accessible to fish in the pond, increasing the total available surface area of the filtering surfaces to pond water, and making the filtering surfaces less prone to clogging. Additionally, by raising the filtering surfaces of the PFU off of the bottom of the pond, gravity will assist in pulling dense debris off of and down away from the PFU. The frame also provides support for camouflaging the PFU with risers and ornamental features, such as plants and pond rocks, without having these camouflaging materials touch the filtering surfaces or otherwise restrict water flow to the filtering surfaces or access by fish to the filtering surfaces.

The PFU comprises at least two cleaning systems: (1) a biological cleaning mechanism; and (2) an internal self-cleaning mechanism.

Regarding the biological cleaning mechanism, the PFU comprises several filtering surfaces that form a repository that collects pond debris on which aquatic creatures feed and provides a filter barrier to the water intake of the pond's circulation pump (hereafter a "screen cage"). More specifically, the screen cage prevents large debris from entering the circulation pump through the water intake system. The filtering surfaces of the screen cage are porous enough for water to freely flow through them, yet impermeable to large debris and other material that would be harmful to or overwork the circulation pump or the pond's other filter systems placed downstream from the pump. All of the mechanical parts of the PFU are located inside the screen cage providing maximum protection for the water intake to the pond's circulation pump and maximizing the available surface area to collect debris and algae, making it more difficult to clog. The suction created by the circulation pump holds debris and algae against the screen cage allowing fish to easily eat the debris and algae. By making each side of the screen cage accessible to the fish in the pond, the fish clean all sides of the screen cage by eating the debris and algae, masticating and/or digesting it into smaller particles that can pass safely through the pump.

The internal self-cleaning mechanism is a spray wash through a water supply pipe that complements the biological cleaning mechanism and doubles as a water supply for the pond. The water from the water source sprays the filtering surfaces of the screen cage from the inside, loosening impacted debris or carrying the debris away from the screen cage thereby opening spaces in the screen cage surface for water to pass. Additionally, agitating the debris in this way allows fish and other aquatic creatures to more readily access and consume it. The water source may be filtered and recycled pond water or water originating from an external source. This second cleaning mechanism may be used to clean the PFU without removing the PFU from the pond, draining the pond or physically accessing the PFU.

Together, the biological cleaning mechanism and the internal self-cleaning mechanism improve the quality of the water in the pond and extend the life of a pump. Hereafter "circulation pump" and "pump" are used interchangeably. The biological cleaning mechanism and the internal self-cleaning mechanism do not necessarily operate at the same time, rather the internal self-cleaning mechanism may be used intermittently to spray clean the screen cage or loosen debris that has caked on the filtering surfaces over time, while the biological cleaning mechanism keeps the screen cage clean the rest of the time. The screen cage is designed to have a total free-flowing surface area on the filter surfaces that is equal to or greater than the area of the aperture of the pump intake pipe.

FIG. 1 shows a perspective view of a bidirectional conveyance pipe 30 which combines the functions of the pump intake pipe 320 and the water supply pipe 330. The pump intake pipe 320 and the water supply pipe 330 are connected with the T-joint port 310 which controls the flow of water on either side of the conveyance pipe. This embodiment illustrates the PFU which includes a conveyance pipe 30, a water supply pipe 330, screen cage (not shown in FIGS. 9, 11, 12 and 15), and a frame 90. The conveyance pipe 30 has a proximal end 30A, a distal end 30B, a first length 30C between the frame 90 and the T-joint port 310 for connecting the conveyance pipe 30 to a circulation pump 320 and a water supply pipe 330; and a second length 30D between the frame 90 and the distal end 30B. The water supply pipe 330 is a conduit for the inflow of water into the pond through the conveyance pipe 30. Specifically, the water supply pipe 330 attaches to a garden hose or other water source through an external port which may traverses the frame 90. In another embodiment, the frame is hollow and water fills the frame 90. This water supply pipe 330 is a PVC pipe. In another embodiment they water supply pipe is made of metal, plastic or other non-corrosive material.

Figure 2:
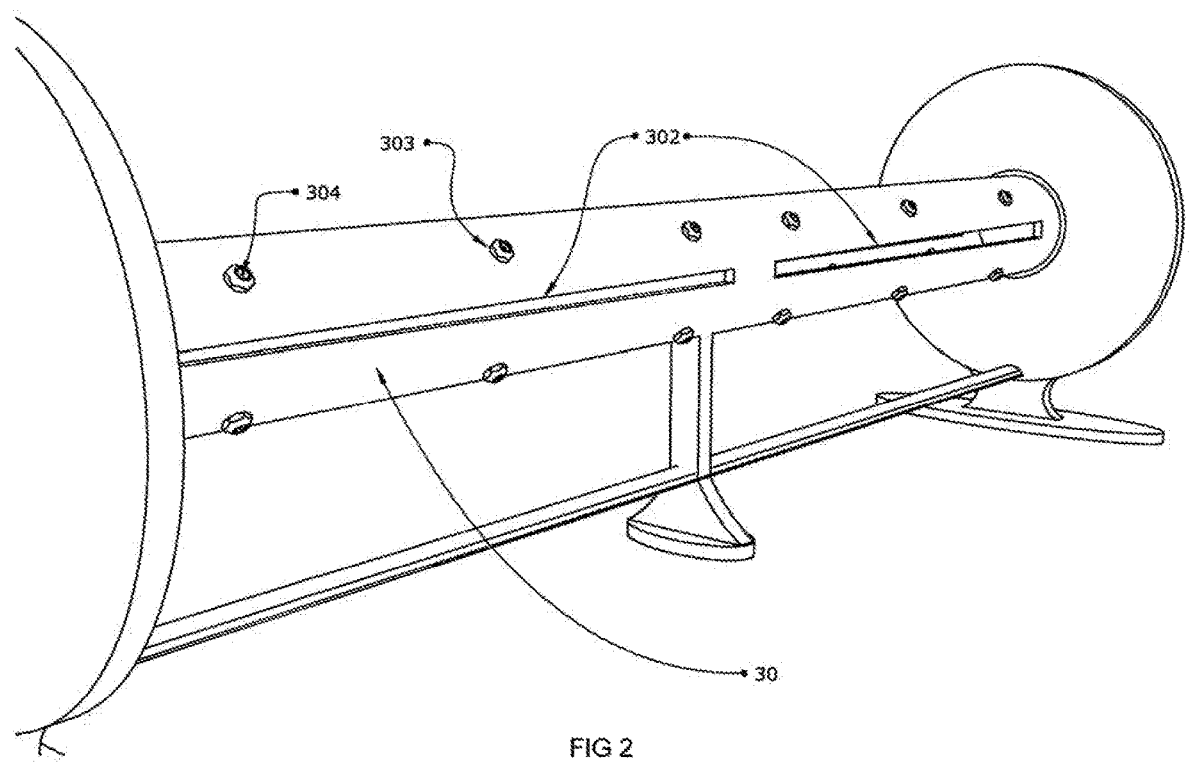
FIG. 2 shows the details of the slots and nozzles of the conveyance pipe.

Referring to FIG. 2, the conveyance pipe 30 is a conduit that attaches to an intake of a circulation pump through which water is suctioned or pulled from the pond by a circulation pump via the intake slots 302. In the present invention, the water pulled from the pond must first pass through the filtering surfaces on the screen cage (not shown) of the PFU. In one embodiment, the conveyance pipe has a plurality of holes 303 which are co-located and capped with a plurality of nozzles 304, said nozzles 304 control the outflowing water spray that results from a push of water pressure from the circulation pump by way of the intake pipe 320. The plurality of nozzles 304 are positioned along the length of the conveyance pipe 30.

Figure 3:
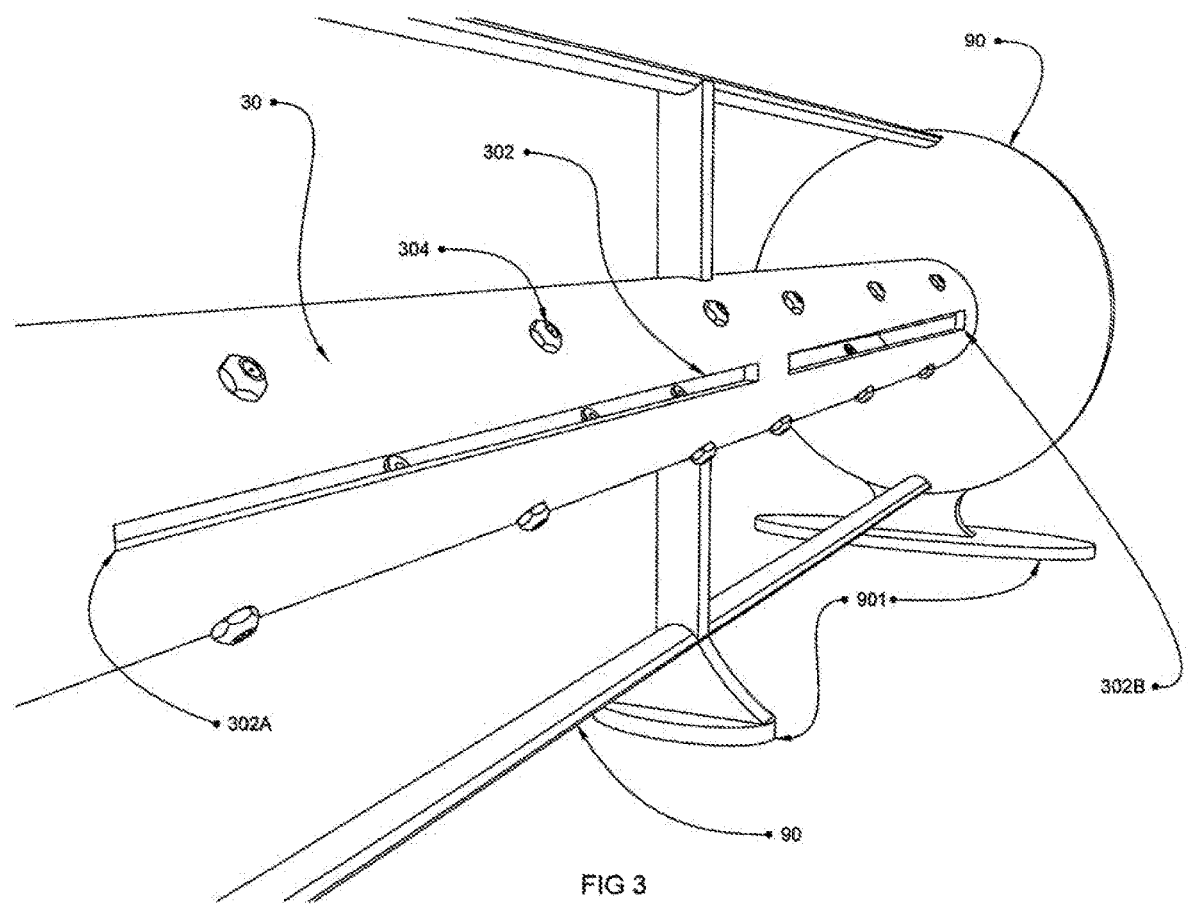
FIG. 3 shows a perspective view of the slots and nozzles of the conveyance pipe.

FIG. 3 shows another view of the slots 302 and nozzles 304 of the conveyance pipe 30. In an embodiment, water flows into the conveyance pipe 30 through slots 302 extending along the sides of the conveyance pipe. Intake slots 302 distribute pressure load more uniformly across the filter screen surface than more commonly used intake holes. In addition and to compensate for higher flow rates closer to the pump, both intake port flow options grow wider as their distance from the pump increases. The intake slots 302 include a first end 302A and a second end 302B, the first end 302A of the intake slots is closer to the pump. The size of the opening of the intake slots is variable and increases along the slot, from the first end to the second end, in order to distribute the pressure load uniformly across the filter screen surface. This compensates for higher flow rates which are generated closer to the pump.

Figure 4:
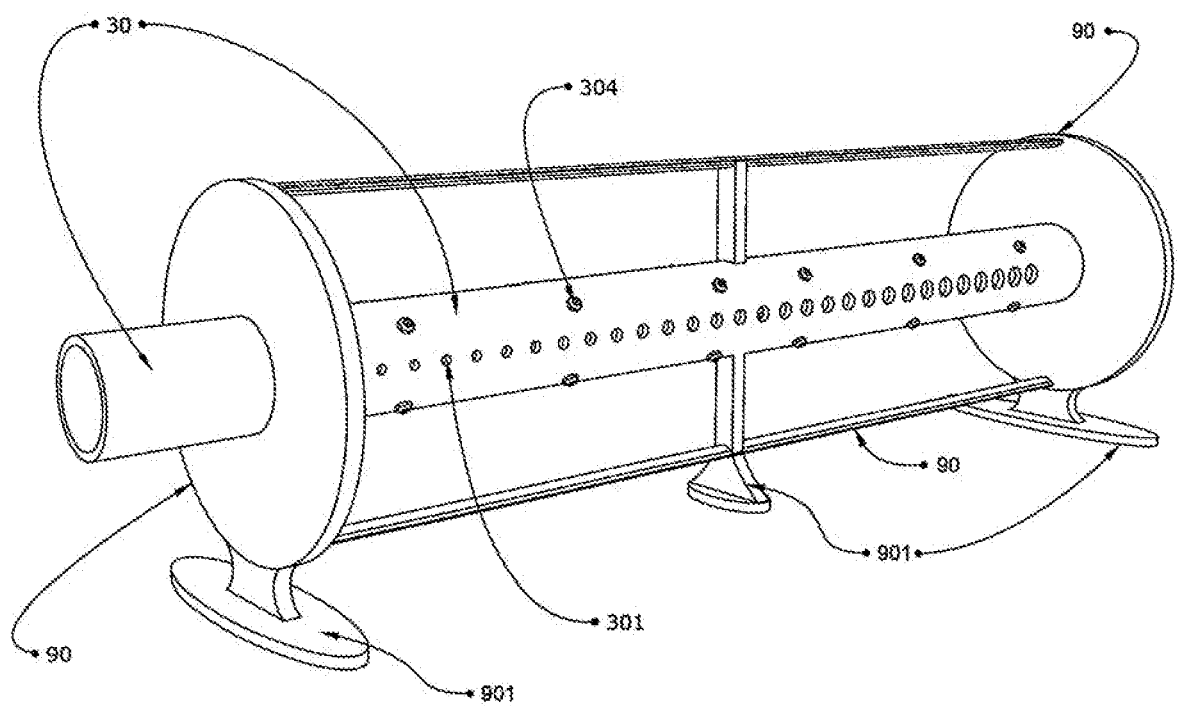
FIG. 4 shows a single water conveyance pipe with a plurality of holes on the pipe.

FIG. 4 shows another embodiment of single water conveyance pipe 30 in which the slots 302 are replaced with a plurality of holes 301 on the pipe. In another embodiment, the diameter of the holes may increase in diameter size moving distally and/or be placed closer together moving distally along the conveyance pipe 30 (as shown in FIG. 4).

Figure 5:
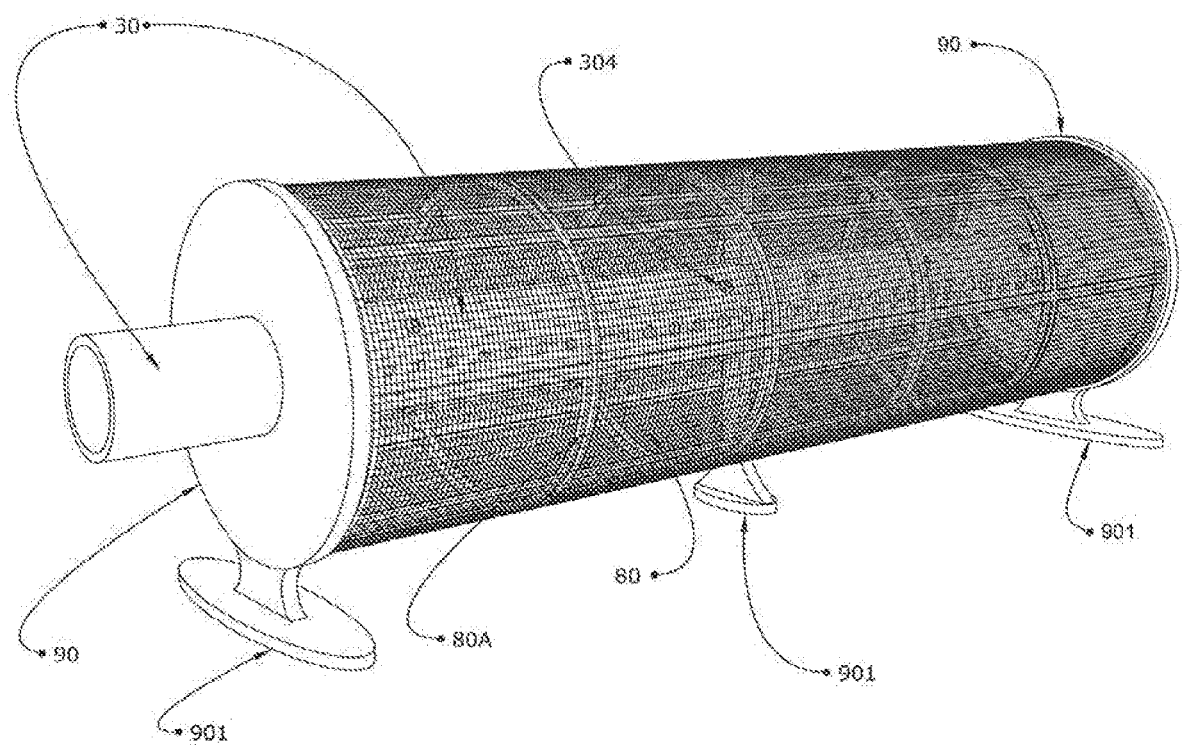
FIG. 5 shows FIG. 4 with a screen cage.

FIG. 5 is FIG. 4 with the screen 80 and screen support structure 80A which keeps the screen cage 80 from collapsing if it gets too clogged such as with algae or debris.

Figure 6:
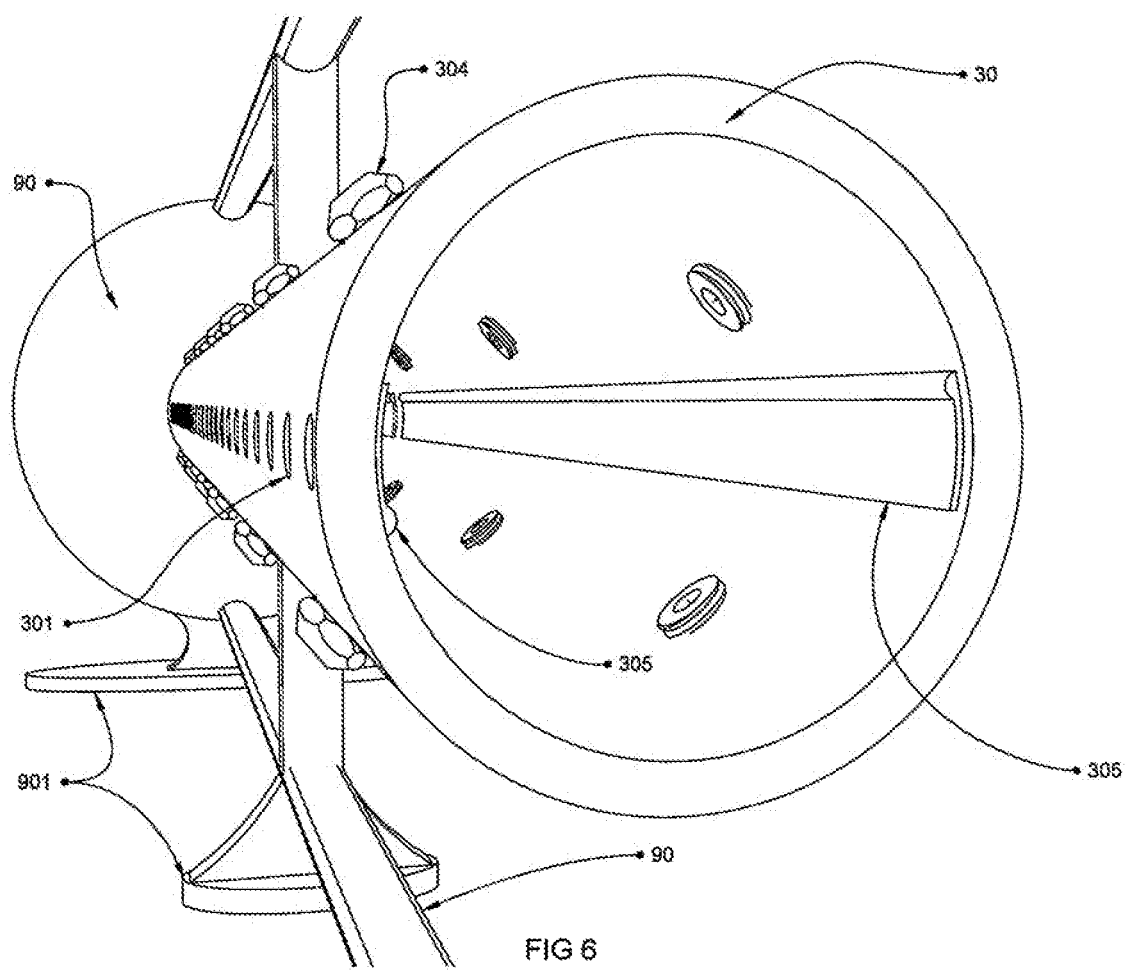
FIG. 6 shows an interior view of the conveyance pipe including a closure in a closed state.

FIG. 6 shows an interior view of the conveyance pipe 30 including a closure 305 in a closed state. The intake ports which are the slots 302 or plurality of holes 301 (hereafter called generically "intake ports") are coupled with the closure 305. In general, the closure is normally closed, and the intake ports are sealed when the PFU is not operating (neither filtering nor backwashing). The closure 305 and thus the intake ports are in an open or closed state depending on the direction of water flow in the conveyance pipe.

During operation, the pre-filter unit draws water into the circulation pump. During filtering mode, the circulation pump creates a low pressure area inside the conveyance pipe 30 which further causes higher pressure water outside the conveyance pipe 30 to push inside through the intake ports. In backwash mode, the water is pushed into conveyance pipe 30 via water supply pipe 330 in order to create pressure causing the closure 305 to close and seal the intake ports thereby allowing the water to flow only through the plurality of nozzles 304. The backwash water is prevented from escaping through the intake ports. As a result, the conveyance pipe 30 distributes the water pressure across the filter cage in order to loosen and or dislodge algae and debris on the filtering surfaces when the screen cage is submerged in water.

Figure 7:
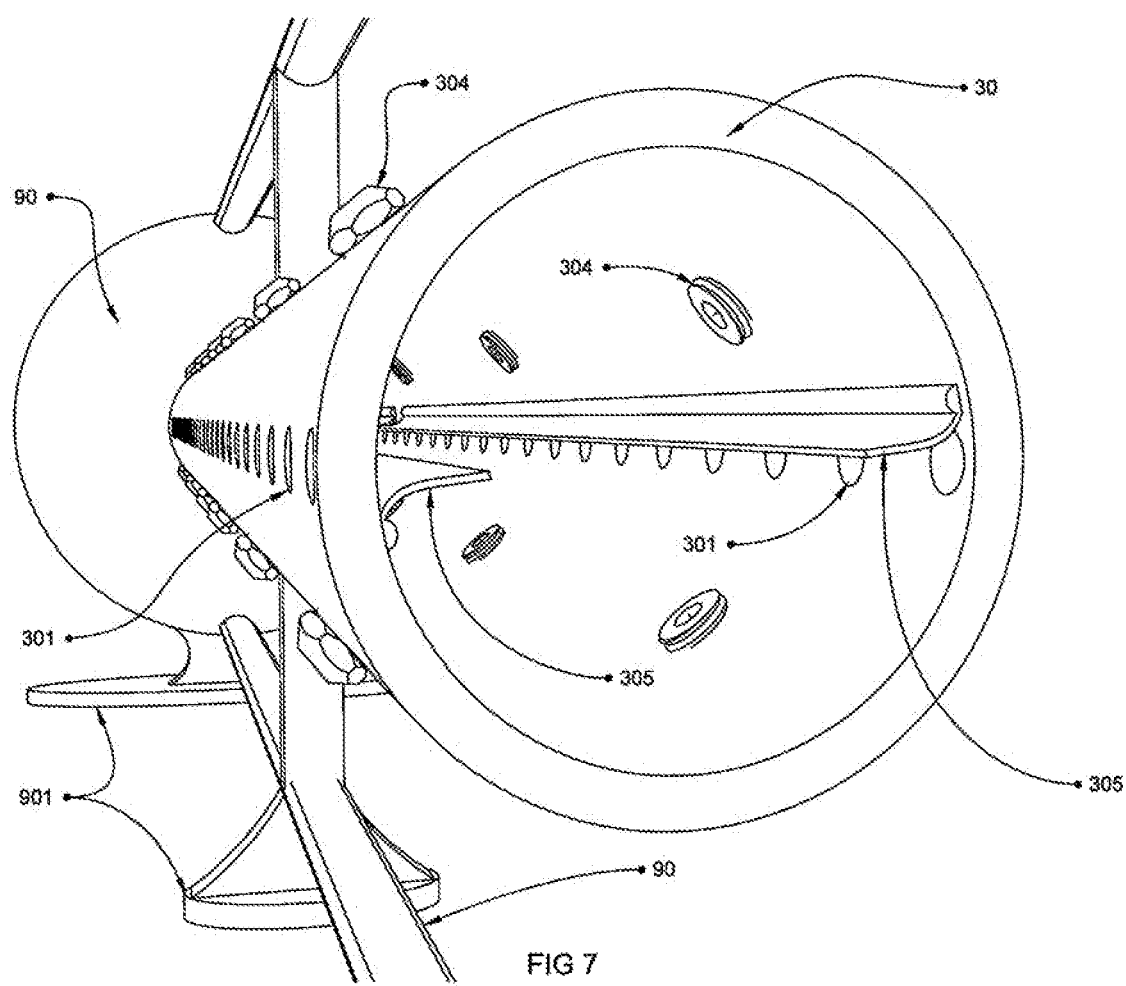
FIG. 7 shows an interior view of the conveyance pipe including a closure in an open state.

FIG. 7 shows an interior view of the conveyance pipe 30 including a closure 305 in an open state. During operation of filtering mode, the pump creates a low pressure area inside the conveyance pipe 30 which causes higher pressure water outside the pipe to push and hold open the closure 305.

Each screen cage 80 has at least one filtering surface. See for example FIGS. 5 and 12. In one embodiment, there is at least one conveyance pipe 30 for every screen cage 80. Within this embodiment, the water flow in each conveyance pipe 30 is bidirectional. That is water can flow toward the pump during filtering mode or reversed to flow through the filter cage during backwashing mode. However, simultaneous bidirectional flow in systems with one filter screen cage requires more than one conveyance pipe in the pre-filter unit.

Figure 8:
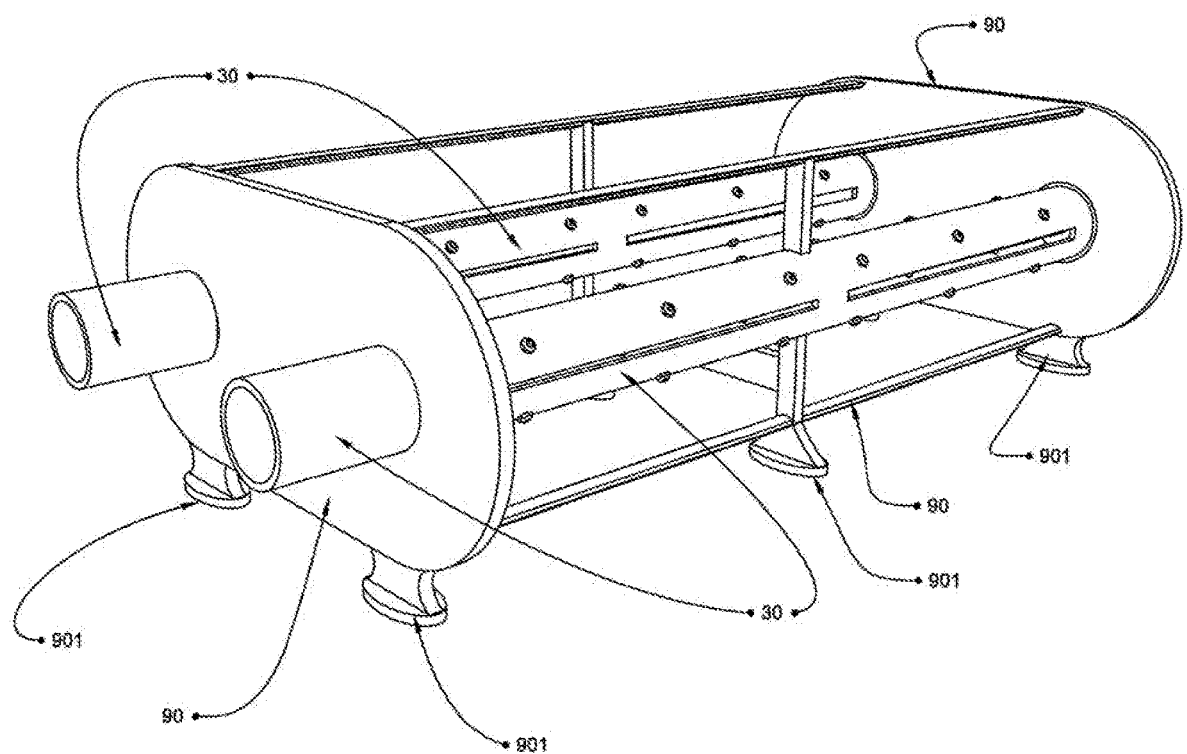
FIG. 8 shows a pre-filter unit with two-conveyance pipe configuration.

FIG. 8 shows an embodiment of single cage with two a two-conveyance pipe 30 configuration. A larger sized single cage can accommodate more than two conveyance pipes 30 (embodiment not shown). A PFU system with a single conveyance pipe 30 requires an external water source for backwashing mode. It's not possible to simultaneously push and pull water through the same conveyance pipe. For backwash mode in this configuration, water flow to the pump through the T-joint port must be stopped for water to flow through T-joint port from the external water source through the conveyance pipe 30.

Figure 9:
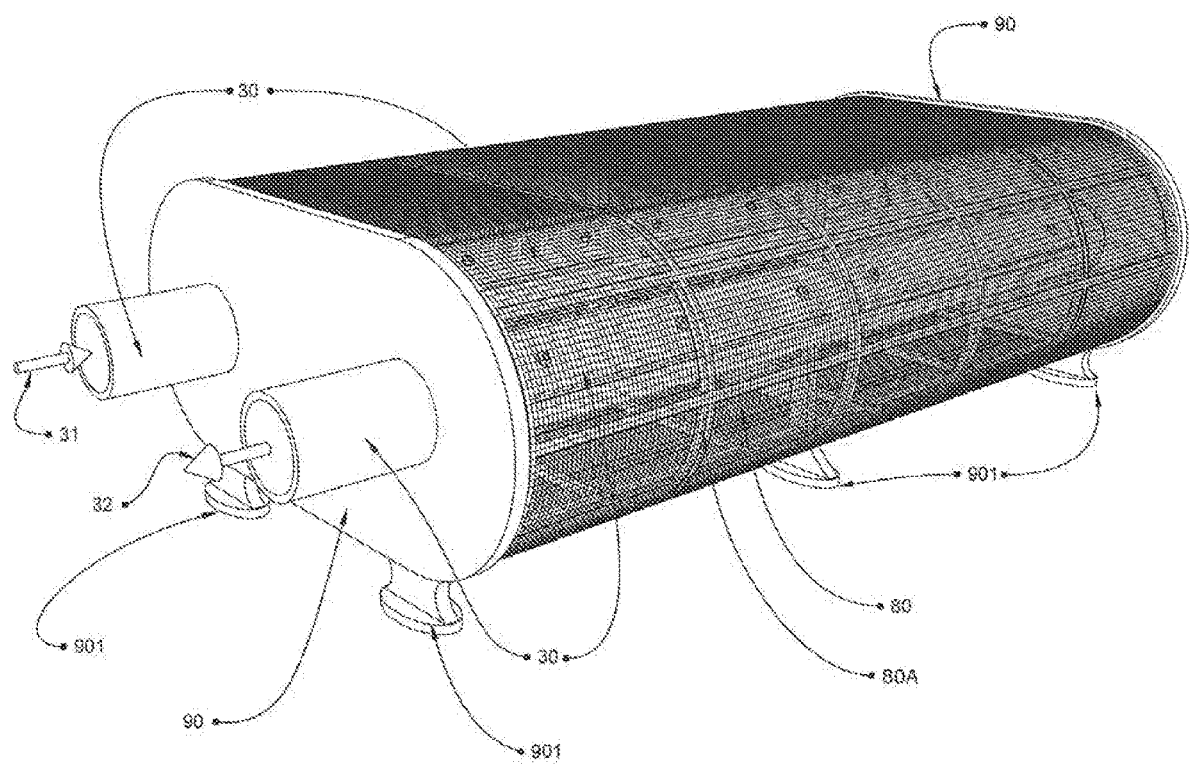
FIG. 9 shows FIG. 8 with a screen cage.

FIG. 9 is FIG. 8 with the screen cage 80 and screen support structure 80A which keeps the screen cage 80 from collapsing if it gets too clogged such as with algae or debris. FIG. 9 also shows an embodiment with two conveyance pipes 30 that could be in a single screen cage. In such an embodiment, it is possible for water flow to be bidirectional, that is flowing into one conveyance pipe 30 and out of the other conveyance pipe 30, as indicated by the water flow arrows 31 and 32.

Figure 10:
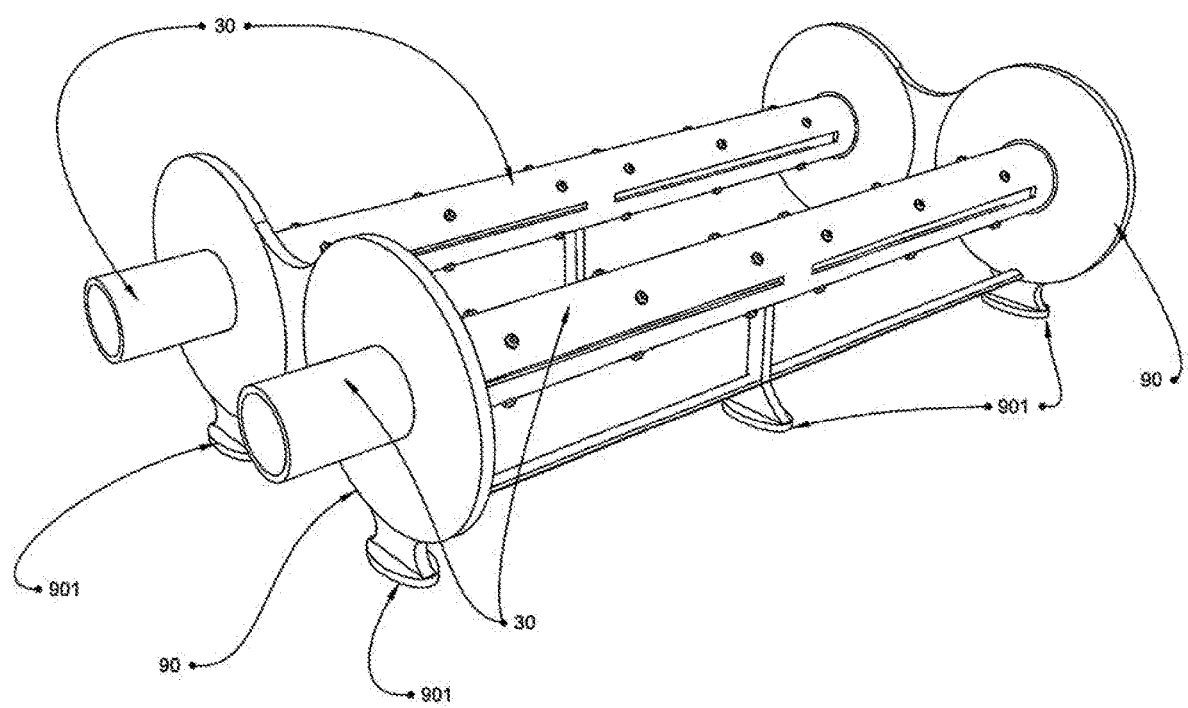
FIG. 10 shows multiple conveyance pipes that are in two separate cages.

FIG. 10 shows an embodiment with two conveyance pipes 30 that could be in two separate screen cages. In such an embodiment, it is also possible for water flow to be bidirectional, that is flowing into one conveyance pipe 30 and out of the other conveyance pipe 30, as indicated by the water flow arrows in FIG. 10. (Water flow arrows not shown.)

Figure 11:
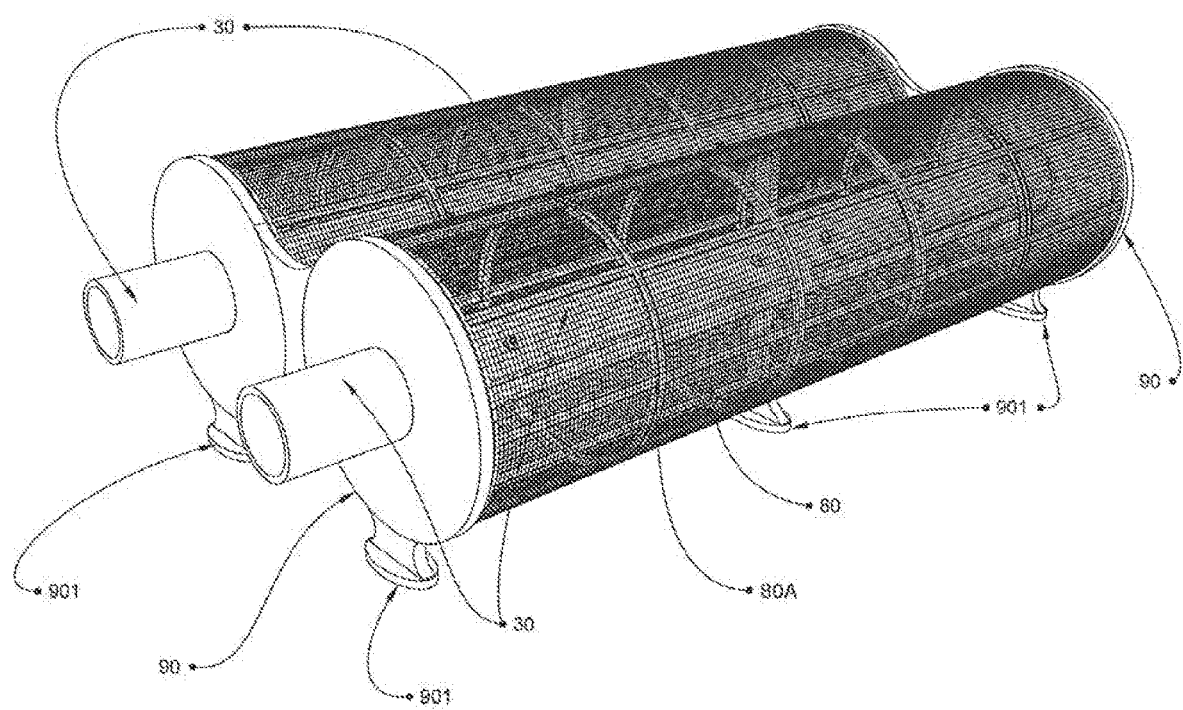
FIG. 11 shows FIG. 10 with a screen cage

FIG. 11 is FIG. 10 with two separate screen cages 80 and screen support structure 80A which keeps the screen cage 80 from collapsing if it gets too clogged such as with algae or debris.

Figure 12:
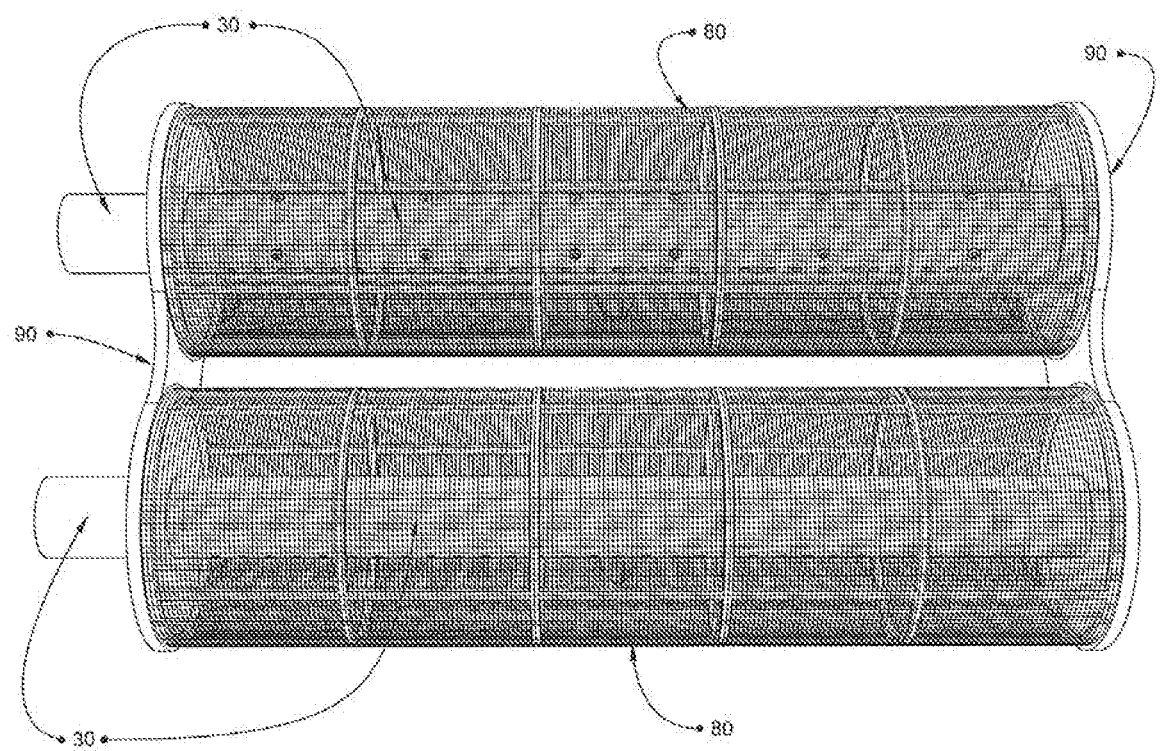
FIG. 12 shows the top view of FIG. 10.

FIG. 12 shows top view of FIG. 10 with two screen cages 80 each screen cage 80 containing a single conveyance pipe 30. With two or more cages, one cage can be in backwash mode while the other(s) are in filtering mode. The pump does not necessarily need to stop. Backwashing water can be supplied by taking a tap off the filter pump output or from an external water source. FIG. 10 and FIG. 11 demonstrate a two cage PFU system and FIG. 12 is a top view the same two cage PFU system. In multiple cage configurations, flow valves may be required to direct water flow in the proper direction.

In one embodiment, when the water source is turned on, the water that enters the water supply pipe 330 travels to the conveyance pipe 30 which in turn causes pressure to increase inside the pipe chamber. Water exits through the holes 303. In one embodiment, the holes 303 are capped by nozzles 304. The nozzles 304 make it possible to spray the outflowing water in specific directions from the inside of the screen cage 80 outward to loosen debris and algae that has settled on the outside surface of the screen cage 80. In another embodiment, the nozzles 304 direct high-pressure water flow to focused areas and the nozzles to cover the majority of all filtering surfaces. One of ordinary skill in the art could design the internal self-cleaning mechanism in other ways so long as it pushes enough water from inside the screen cage to clean debris and algae off the filtering surfaces. In other embodiments, this may be accomplished using a series of nozzles that are turned on and off by a control mechanism. In one embodiment, a pressurized air source is used to augment the water source. In another embodiment, the PFU is treated with a protective coating to prevent growth of algae or biofilms on the PFU.

In another embodiment, the pump intake pipe 320 is inside the screen cage 80. This embodiment includes a frame 90 having at least three supports 901, a circulation pump (not shown) attached to a T-joint port 310 and a water source 330 attached to a second port (not shown). In one embodiment, the frame leg supports 901 elevate the screen cage 80 above the bottom of a pond or other body of water. This makes the filtering surfaces of the screen cage 80 easily accessible to fish from the top and bottom of the screen cage 80. In one embodiment, the legs 901 are adjustable with regard to height and placement under the frame 90.

Hiding man-made components on the bottom of a pond can be done in several ways, for example a single large rock covering the components, plants, or even some type of black material that matches the pond liner. To create a completely natural look, it is desirable to cover the entire pond floor in rocks and plants. But, placing rocks or planters directly onto a pond liner can cause problems. While these rocks and plants increase overall surface area for beneficial bacteria, they can also create locations where water does not circulate and where the oxygen becomes depleted. In these low-oxygen areas, anaerobic bacteria can thrive and begin to compete with beneficial bacteria creating toxins that can harm other aquatic creatures in the pond. The PFU allows for the aesthetic appearance of a rock bottom pond, while still allowing water flow below and around the rocks, which promotes a healthy ecosystem.

Figure 13:
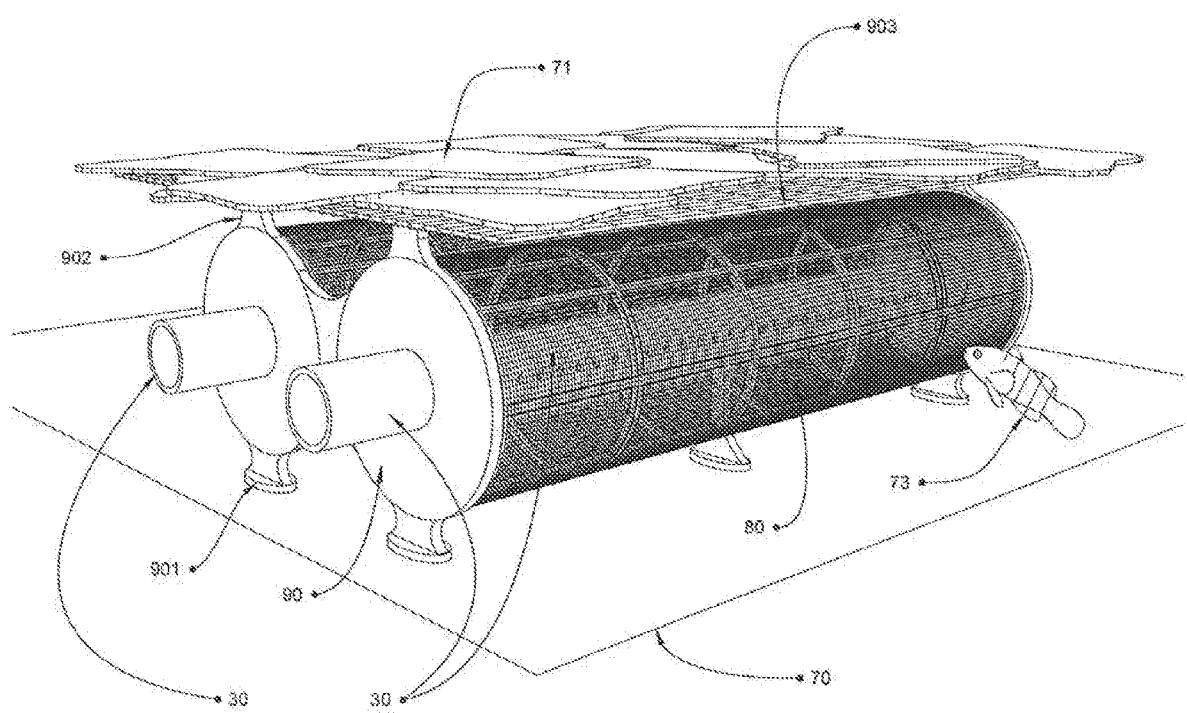
FIG. 13 shows a top view of a PFU partially camouflaged in a pond by ornamental rocks and a cutaway view of the PFU below.

FIG. 13 shows a top view of a PFU partially camouflaged in a pond by ornamental rocks 120 and a cutaway view of the PFU below. As shown, however, these ornamental rocks 120 are not actually on the bottom of the pond, but rather form a false bottom creating a space between the ornamental rocks 120 and the pond liner below. The PFU, the pump and other man-made components are placed in this space, concealing them and achieving a natural presentation when viewed from above. The space also provides a sanctuary for fish to escape non-aquatic predators.

Placing the PFU under a false bottom of ornamental rocks creates a problem. Specifically, hidden under the rocks, the user cannot see or easily access the pump or PFU. This necessitates the active internal cleaning mechanism illustrated in above FIGS, an active water spray wash for the PFU, which is accessible without removing the PFU from the pond, draining the pond or physically accessing the PFU.

In one embodiment, risers or other supports 130 are placed on top of the submerged PFU. These risers 130 support the ornamental rocks 120 so that the rocks will not damage the PFU or cause a tear in the screen cage 80. The risers 130 or other supports for the ornamental rocks 120 need to be made of materials that will not deteriorate or corrode in water. Sample materials include aluminium, stainless steel, polyvinyl chloride (PVC) and polypropylene plastic, or any combination of these materials. In one embodiment, the risers 130 are made from an old plastic pallet. The ornamental rocks 120 are both decorative and protective. They also provide a safe space for fish to hide from non-aquatic predators—cats, birds, children, etc.

Figure 14:
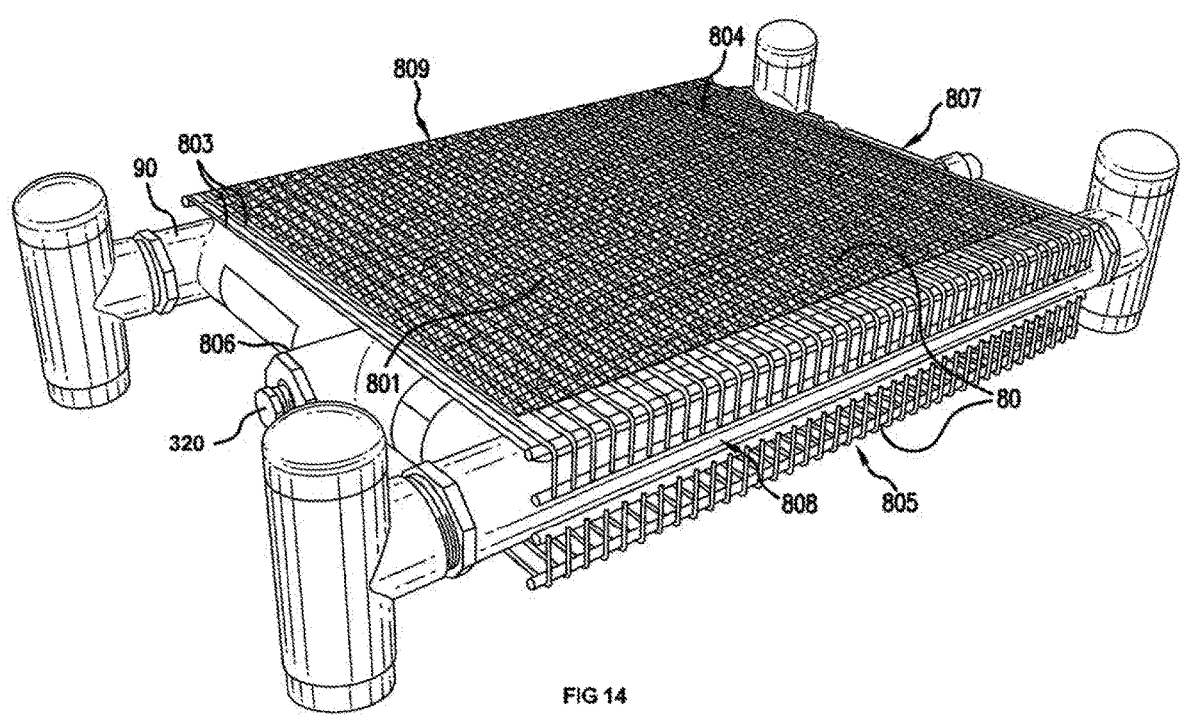
FIG. 14 shows an angle view of the PFU with the filtering surfaces in place.

FIG. 14 shows a rudimentary embodiment of the PFU with the screen cage 80. The screen cage 80 is a filtering surface comprising a plurality of filtering layers that include, for example, fine mesh screens (or "grates") 801 supported by powder-coated wire shelving 803. In this embodiment, the frame 90 and screen cage 80 are in the shape of a 3-dimensional rectangle screen cage 80 having a top 804, a bottom 805, front side 806, back side 807, a right end 808 and a left end 809. The fine mesh screens 801 on the top 804 and bottom 805 surfaces are the filtering surfaces. The screens collect debris that can be eaten by aquatic creatures in the pond and/or cleared away using the internal cleaning mechanism. The screens provide easy access for aquatic creatures to consume, masticate, or otherwise break up the debris into smaller pieces that can safely pass through the pump.

In one embodiment, the right end 808 and left end 809 of the screen cage are formed by the PFU frame 90 with only the top 804 and bottom 805 of the screen cage being filtering surfaces. That is, the front and back sides are closed by the PFU frame 90 itself while top 804 and bottom 805 are filtering surfaces of the screen cage 80. The PFU is, however, closed to large debris as the front side 806 and back side 807 are blocked by the PFU frame 90. That is, any water from the pond must pass through the screen cage to enter an alternate pump intake pipe 320.

In another embodiment, the screen cage 80 and/or the filtering surfaces have the shape of a cylinder, sphere, pyramid, cone, prism, or other polyhedron. In another embodiment, the screen cage 80 has a pleated surface to provide additional surface area along the filtering surfaces.

Figure 15:
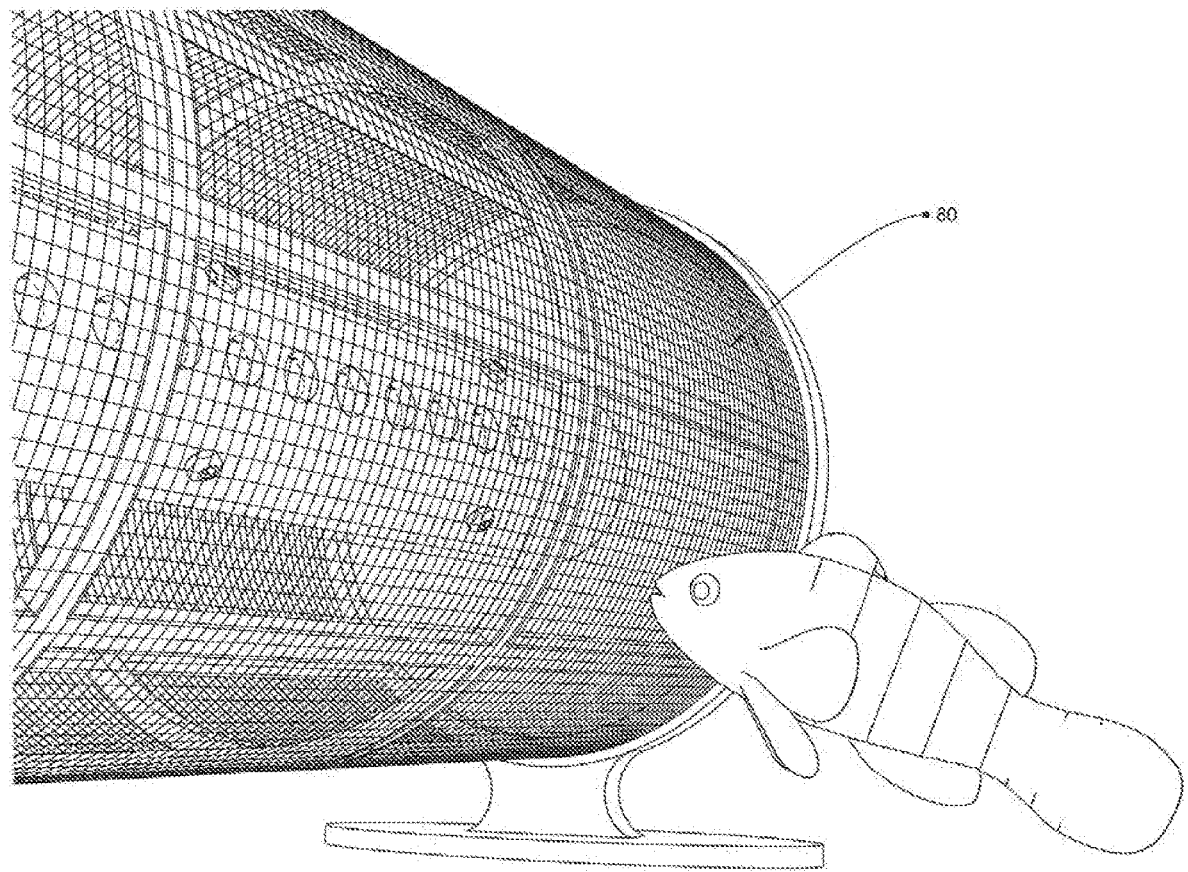
FIG. 15 shows a schematic of the PFU biological cleaning mechanism.

FIG. 15 is a schematic of the first cleaning mechanism of the PFU having aquatic creatures eat the debris deposited on the outside of the screen cage 80, i.e., the biological cleaning mechanism. Fish have been videotaped cleaning the outside of the screen cage, and this cleaning by the fish reduces the frequency that the internal cleaning mechanism needs to be used. The internal self-cleaning mechanism (implemented simply by turning on the water source connected to the water supply pipe) is needed only when the debris build-up on the outside of the screen cage 80 outpaces the appetite/eating capacity of and/or number of aquatic creatures in the pond. It is notable that Koi and goldfish are largely dormant in colder temperatures, so the frequency for using the internal self-cleaning mechanism may be temperature dependent. In one embodiment, the temperature of the pond 2 is controlled by adding warm water that is heated using solar panels and/or other methods of heating water known to those of ordinary skill in the art, to optimize the feeding activity of the aquatic creatures.

In one embodiment, the PFU has leg supports 901 built into the PFU. Support under the frame 90 allows the PFU to be placed at the bottom of a pond so that its filtering surfaces are not touching the bottom of the pond allowing free-flow of water and enough space for fish and other aquatic creatures to access the bottom surface of the screen cage 80. In another embodiment, the legs or supports are provided separately and placed underneath the PFU.

The present design contemplates the use of Koi and goldfish because they are the most common types of ornamental pond fish, however, other species of fish and other aquatic creatures may be used so long as they will eat the debris deposited on the PFU. In the present embodiment, common goldfish and Koi populate the pond. Both are extremely hardy and can survive temperature extremes. Also, they're both omnivores, eating a wide variety of foods. Algae is one of their main and favoured food sources. Other fish species are contemplated as long as they can survive the climate and would do the same work as Koi and goldfish to fulfill the biological cleaning mechanism of the PFU.

In one embodiment, the screen cage 80 is made of multi-layer-mesh material. It may be made with only one mesh layer. Whatever the mesh strength or number of layers comprising the screen cage 80, the PFU should have sufficient strength and surface to distribute pressure over a wide area and to sustain function in places where high-point pressure loads can occur when the screen cage is dirty. This will vary pond to pond. The invention is not limited to ornamental ponds and may be used in any type of marine habitat where a water circulation pump is used and fish are present. The PFU can be sized and scaled accordingly for use by one of ordinary skill in the art from ornamental backyard ponds to industrial-level fish farms. Anywhere a circulation pump is used, the combined cleaning mechanisms of the PFU will improve the quality of the water and extend the life of the circulation pump. Compared to commercially available systems, maintenance of the PFU is minimal.

In one embodiment, the PFU has tolerated internal self-cleaning water pressures of 92 psi, the unregulated pressure supplied by a local municipal water source. As for water pressure created by the circulation pump pulling water through the screen cage, the PFU has tolerated pressures created by a 3200 gallon per hour pump. Distributing that load over a wider area and improving the strength of the screen cage 80 will prevent excessive pump pressure from tearing the screen cage 80 and/or crushing the PFU.

In one embodiment, the PFU has a circulation pump enclosed within the screen cage. This would create an "all-in-one" unit.

Particles that pass through the outside surfaces are small enough to pass easily through the pump without damaging it, thus there is no need for a filter media other than the filtering surfaces. Filter media would eventually clog the PFU and need to be pulled out, thus creating higher and more frequent maintenance. The PFU may work in concert with a biological filter outside the pond that uses filter media (foam mats and plastic bio-ball-like parts). The PFU is in line ahead of the pump to prevent over-sized debris from damaging the pump. The PFU is not intended to be a microbiological filter system, but rather a pre-filtering system.

Embodiments of this invention are described herein. Variations of those embodiments may become apparent to those having ordinary skill in the art upon reading the foregoing description. The inventors expect that skilled artisans will employ such variations as appropriate, and the inventors intend for the invention to be practiced other than as specifically described herein. Accordingly, this invention includes all modifications and equivalents of the subject matter recited in the claims appended hereto as permitted by applicable law. Moreover, any combination of the above-described elements in all possible variations hereof is encompassed by the invention unless otherwise indicated herein or otherwise clearly contradicted by context.

While the disclosure above sets forth the principles of the present invention, with the examples given for illustration only, one should realize that the use of the present invention includes all usual variations, adaptations and/or modifications within the scope of the claims attached as well as equivalents thereof.

All references, including publications, patent applications, and patents cited herein are hereby incorporated by reference to the same extent as if each reference was individually and specifically indicated to be incorporated by reference and was set forth in its entirety herein.

The use of the terms "a" and "an" and "the" and similar references in the context of describing an invention (especially in the context of the following claims) are to be construed to cover both the singular and the plural, unless otherwise indicated herein or clearly contradicted by context. The terms "comprising," "having," "including," and "containing" are to be construed as open-ended terms (i.e., "including, but not limited to,") unless otherwise noted. Recitation of ranges as values herein are merely intended to serve as a shorthand method of referring individually to each separate value falling within the range, unless otherwise indicated herein, and each separate value is incorporated into the specification as if it was individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention (i.e., "such as, but not limited to,") unless otherwise claimed. No language in the specification should be construed as indicating any non-claimed element as essential to the practice of the invention.

Those skilled in the art will appreciate from the foregoing that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A pre-filter unit for a water circulation pump, comprising:
    at least one conveyance pipe having an interior, an exterior, a proximal end, a distal end and a port located at the proximal end for connecting the conveyance pipe to a circulation pump and a water supply pipe; the conveyance pipe further comprising a plurality of intake port openings through the conveyance pipe arranged substantially in rows along the length of the conveyance pipe, and a plurality of holes through the conveyance pipe, said plurality of holes capped with a respective plurality of nozzles, said intake port opening rows located between at least two rows of the capped holes;
    a closure on an internal surface of the conveyance pipe, extending substantially the length of the row of the plurality of intake port openings and aligned with each intake port opening, said closure positioned to open and close the plurality of intake port openings from the interior of the conveyance pipe;
    a screen cage surrounding said pre-filter unit having a front side, back side, left side, right side, top side and bottom side, wherein at least two of said sides have a filtering surface configured to collect algae and debris;
    a biological cleaning mechanism on the outside of said screen cage; and
    a frame interconnected to the screen cage, said frame having a length disposed beneath and elevating said pre-filter unit.

2. The pre-filter of claim 1, wherein the closure is open or closed depending on the direction of water flow in the conveyance pipe.

3. The pre-filter of claim 1, wherein the filtering surfaces have a total surface area that is greater than the area of the pump intake pipe aperture.

4. The pre-filter of claim 1, the frame further comprising adjustable leg supports for elevating the screen cage.

5. The pre-filter of claim 1, wherein said pre-filter is treated with a protective coating to prevent the growth of algae or biofilms.

6. The pre-filter of claim 1, wherein the screen cage shape is a cylinder, sphere, pyramid, cone, prism, or other polyhedron.

7. The pre-filter unit of claim 1, wherein the pre-filter unit further comprises the closure further comprising a flap configured to rotate about an axis substantially parallel with the conveyance pipe length, wherein the flap rotates between a closed position and an open position depending on the direction of water flow in the conveyance pipe.

8. The pre-filter unit of claim 7, wherein the pre-filter unit further comprises the flap configured to seal the plurality of intake port openings when the flap is in the closed position and unseal the plurality of intake port openings when the flap is in the open position.

* * * * *